United States Patent [19]
Knapp

[11] Patent Number: 5,197,770
[45] Date of Patent: Mar. 30, 1993

[54] COUPLING PART

[75] Inventor: Jurgen Knapp, Lappersdorf, Fed. Rep. of Germany

[73] Assignee: Knapp Mikrohydraulik KG, Fed. Rep. of Germany

[21] Appl. No.: 683,989

[22] Filed: Apr. 11, 1991

[30] Foreign Application Priority Data

Apr. 11, 1990 [DE] Fed. Rep. of Germany ....... 4011756
Nov. 13, 1990 [DE] Fed. Rep. of Germany ....... 4036016
Feb. 9, 1991 [DE] Fed. Rep. of Germany ....... 4104009

[51] Int. Cl.[5] .............................................. F16L 41/08
[52] U.S. Cl. ...................................... 285/353; 285/319
[58] Field of Search ......................... 285/196, 353, 319

[56] References Cited

U.S. PATENT DOCUMENTS 3,711,125  1/1973  Dehar ............................ 285/319 X
3,997,196  12/1976  Karcher et al. ................. 285/319 X
4,083,586  4/1978  Helm ..................................... 285/323

FOREIGN PATENT DOCUMENTS 343036    11/1989  European Pat. Off. .
2730611   8/1978   Fed. Rep. of Germany .
2853281   6/1979   Fed. Rep. of Germany .
3235059   3/1984   Fed. Rep. of Germany .

Primary Examiner—Eric K. Nicholson
Attorney, Agent, or Firm—Lucas & Just

[57] ABSTRACT

The coupler part allows for joining of a hydraulic line to a hydraulic component such as a hydraulic cylinder. The coupler has an outer and inner element. Both elements are sleeve-like in construction. The outer element is attached to the hydraulic component while the inner element is connected to the hose. A slit ring or spring fingers are used to allow the inner element to easily couple with the outer element but prevent the inner element from uncoupling from the outer element except by disassembling the whole coupler unit.

18 Claims, 9 Drawing Sheets

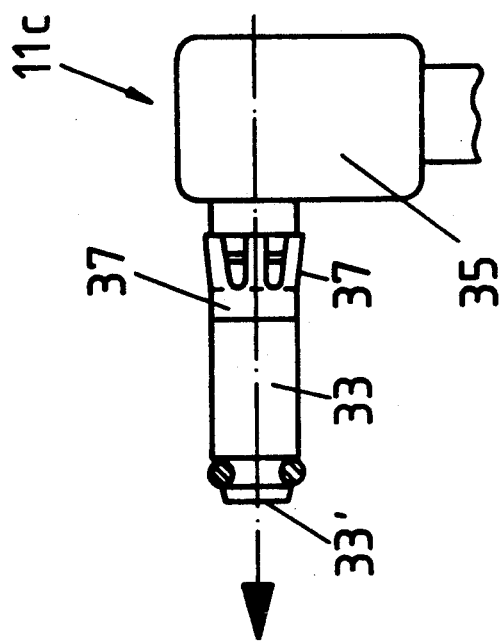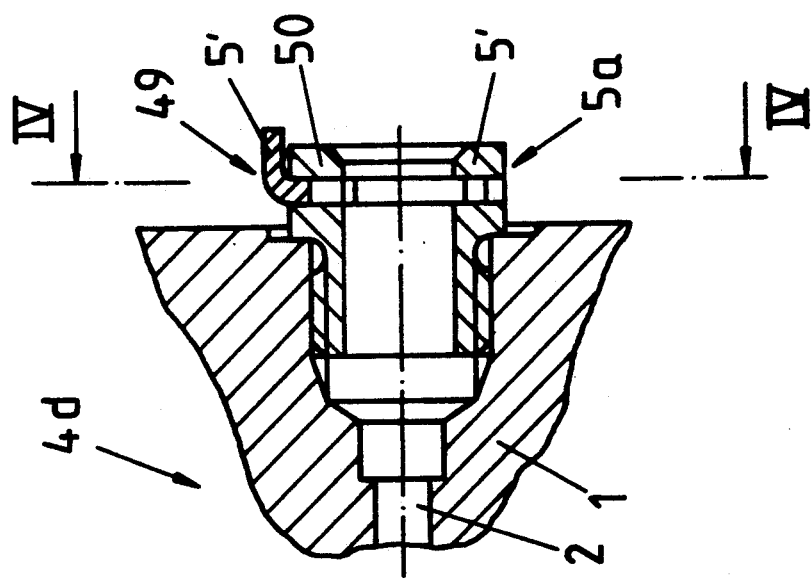
Fig. 11
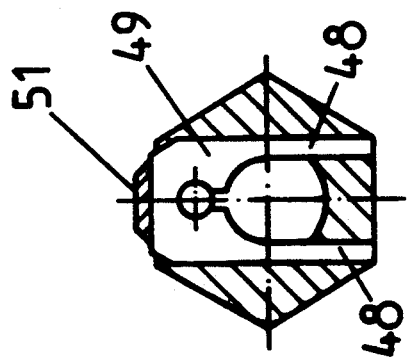
Fig. 12

COUPLING PART

The invention relates to a coupling part which, in order to make a fluid connection, in particular a hydraulic connection, between a first fluid-handling component and a second fluid-handling component, is attachable to said first component and removably fixable in a receptacle of said second fluid-handling component.

BACKGROUND OF THE INVENTION

Coupling parts of this kind are known in a wide variety of types, in particular for hydraulic connections to be used in hydraulic systems. The removable fixation is usually achieved by means of a screw connection composed of an external thread on the coupling part and a matching internal thread in the corresponding receptacle, so that the known coupling parts, or the connections made by their means, may alternatively be referred to as screw couplings. The said first fluid-handling components are for example hydraulic connecting or extension lines in the form of pipe or tubing. The said second fluid-handling components are hydraulic elements such as for example hydraulic cylinders, junction blocks, valves or the like. A screw coupling basically has the advantage of high reliability and dependability in service, combined with the advantage that the connection may at need, for example for purposes of repair, be sundered with a suitable tool. The disadvantage of a screw coupling, or screw connection, consists essentially in the relatively great assembly effort involved in making the connection, which in many fields, including for example automobile manufacturing, conflicts with the requirements of production efficiency.

In hydraulic applications, where as a rule very high hydraulic pressures, for example on the order of up to 250 bars and more, are employed, the coupling part must be expected not only to make a secure and faultless connection, but also to be of such configuration that the connection is positively assured, any defects in the connection being ruled out.

SUMMARY OF THE INVENTION

The object of the invention is to disclose a coupling part which, while retaining the advantages of a coupling part with removable fixation and low assembly outlay, will guarantee a faultless and dependable connection in the coupling of two fluid-handling components.

The invention creates the possibility of preassembling the outer, sleeve-like element in the receptacle of the respective second fluid-handling component at the actual time of production of the latter. This is possible without major outlay as a rule because the necessary aids to efficient manufacture and assembly will in any event be available on the premises of the manufacturer of the fluid-handling components. On the user's premises, i.e. for example those of the manufacturer of machinery or automobiles who procures the fluid-handling components with the preassembled elements of the coupling part in question, the connection between a said first and a said second fluid-handling component may be achieved by simple introduction or insertion of the inner element into the outer element, i.e. by plug-in assembly, which is very simple to perform especially in places, for example on an automobile, that are not readily accessible to a tool, The removable fixation in the case of the invention is achieved by means of "rotary" connection. By a "rotary" connection is meant preferably a screw connection between the coupling part and the second fluid-handling component. However, other connections effected by rotation, or by rotating in, such as for example bayonet-type connections or connections using a retaining nut provided on the coupling part, may be used.

At need, i.e. for example for repair purposes, the connection made with the coupling part according to the invention may be sundered at any time with a suitable tool. The invention thus combines the advantages of such a screw coupling with the advantage of simple plug-in assembly.

In one embodiment of the invention, catch elements in the form of expansion or catch tabs are provided for connecting the outer and inner elements of the coupling piece. On the inner element, a contact surface of conical configuration is then provided, forming a purchase for the expansion tabs. This represents a quite decisive factor for the dependability and serviceability of the coupling part in the hydraulic field. The tapered bearing surface not only assists the spreading of the expansion tabs as required for a dependable locking of the inner element in the outer element; the bearing surface also positively obliges all expansion tabs, after the expansion sleeve assembly, to be spread radially outward and project beyond the periphery of the inner element in the manner required for a dependable locking action. This holds true even if the expansion tabs were not spread outward in manufacture of the expansion sleeve, this spreading being effected only upon assembly of the expansion sleeve on the inner element of the coupling part, by the tapered surface. In addition to assisting and intensifying the spring action of the expansion tabs, therefore, the conically tapered surface also positively causes the expansion tabs to be oriented in the required manner. Assembly defects are thus precluded to the utmost extent possible. Besides, the possibility of an especially simple manufacture of the expansion sleeve results.

In another embodiment of the invention, the catch element takes the form of a slit ring of springing or elastic material, preferably spring steel.

To seal the junction between the inner element, or a passage there formed, and a hydraulic line formed in the second hydraulic component, the inner element is preferably provided with a sealing ring resting against a cylindrical backing surface enclosing the sealing ring in the liquid line. This configuration has the advantage that even after the connection has been made, a rotation or swing of the inner element is possible about an axis concentrically enclosed by the backing surface, without any damage to the seal. In this way, a convenient orientation of tubing is possible after assembly.

In still another embodiment, the catch surface is formed by at least one removable locking element. In this embodiment, the two elements of the coupling part can be sundered by simply removing the locking element. Otherwise, preferably a tool in the form of an unlocking sleeve is used to sunder the two elements of the coupling part from each other.

BRIEF DESCRIPTION OF THE DRAWINGS

In the following, the invention will be illustrated in more detail in terms of embodiments by way of example, with reference to the drawings wherein:

FIGS. 11 and 12, much as in FIG. 7 and in section at the line IV—IV, show another embodiment of the coupling part according to the invention;

DETAILED DESCRIPTION OF THE DRAWINGS

Figure 1:
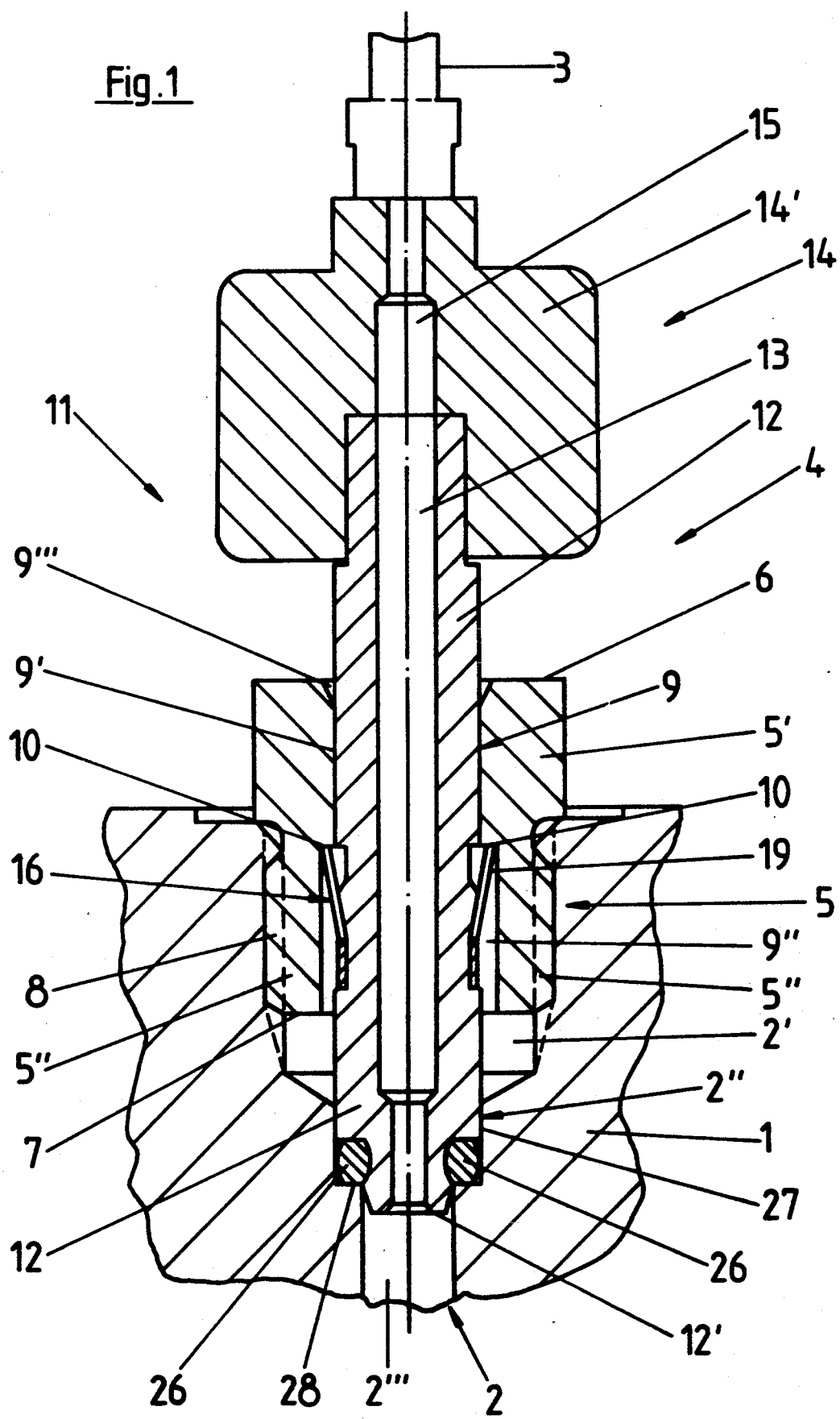
FIG. 1 shows a simplified sectional view of a bi-partite screw coupling part according to the invention.

In the drawings, element 1 is a fluid-handling component, i.e. for example an hydraulic component, or the body of such a component, which admits of the utmost variety in conformation and/or function, for example a cylinder, a junction block, a valve, a hydraulic pump or the like fluid-handling or hydraulic component. To the hydraulic component 1, or to a liquid line 2 formed in said component, for example a passage, chamber or the like for the hydraulic liquid under pressure, is connected one end of a line of tubing 3 in the embodiment of FIG. 1 using a coupling part 4 to which one end of the tube 3 is undetachably fixed in suitable manner, for example using a pinch sleeve.

The coupling part 4 is of bipartite configuration, consisting firstly of an outer sleeve-like element 5 providing a tool hold on a first segment 5', at the top in FIG. 1, at its periphery enclosing the sleeve centerline, i.e. configured in the embodiment shown as a hexagon for a conventional fixed wrench. This segment 5' also comprises the end face 6, on top in FIG. 1, of the sleeve-like element. Adjoining the segment 5', the sleeve-like element has a segment 5" forming in FIG. 1 the bottom end face 7 of the fabricated metal sleeve-like element 5 and provided on the periphery with an external thread 8 whose outside diameter is less than the least diameter of the segment 5'.

The sleeve-like element 5, screwed by its external thread 8 into an internal thread of the cross sectionally enlarged segment 2' of the liquid line 2 from the outside of the hydraulic component 1, has a through bore 9, extending, that is, from end face 6 to end face 7, having a circular cross section over its entire length, and coaxial with the centerline of the sleeve-like element 5. Reading from the end face 6, the bore 9 has first a segment 9' and adjoining it a segment 9" extending to the end face 7 and having a larger cross section than the segment 9'. At the transition between segments 9' and 9", an annular contact surface 10 is formed, enclosing the centerline of the sleeve-like element 5 and lying substantially in a plane perpendicular to said centerline. In the embodiment shown, the axial lengths of the two segments 9' and 9" are about equal. However, this is not an absolute requirement. But since the segment 9', in a manner about to be described in more detail, serves for axial guidance and radial fixation of the inner element 11, having the form of a plug nipple and likewise made of metal, of the coupling part 4, it is necessary for the segment 9' to be of sufficient length for this purpose. In the region of the end face 6, or at the aperture there, the bore 9 is chamfered at 9''' in such manner that it flares conically in the region of said aperture.

The element 11 consists essentially of a part 12 in the form of a sleeve or length of pipe having a cylindrical periphery and provided with a passage 13 coaxial with the centerline of the part 12 and open at the top end and at the bottom end 12' of the part 12. To the upper end of part 12, a head 14, likewise in tubular form, is fixed by hard soldering or other suitable means in such manner that the passage 13 continues sealed to the outside in a passage 15 provided in the head 14. To the top end, in FIG. 1, of the head 14, configured with a portion 14' as a hand hold of greater outside diameter than the part 12, is fixed the aforementioned one end of the tube 3.

Between the top and bottom ends of part 12, spring catch elements projecting beyond the periphery and movable radially inward are provided thereon, whereby the inner element 11 having the form of a plug nipple is held by catching in the outer element 5. In the embodiment shown, these catch elements are formed of a single expansion sleeve 16 made of spring steel in one piece with all its elements by rolling and punching. As is shown with especial clarity in FIGS. 2 and 3, the expansion sleeve 16 is parted at 17 and in particular has a sleeve-like or hollow cylindrical segment, though likewise not completely closed, owing to the parting 17. At a common end of the segment 18, i.e. at the top end of the segment 18 in the representation adopted for FIGS. 1 and 2, the expansion sleeve 16 has four expansion tabs 19 standing off beyond said end, which are concave on their interior side with reference to the centerline of the expansion sleeve 16 and convex on their exterior side, each with more or less the curvature of a circular arc and so bent radially outward that the radial distance of the expansion tabs 19 from the centerline of the expansion sleeve 16 increases with increasing distance from the segment 18, and the expansion tabs make an angle with the centerline of the expansion sleeve. In circumferential direction of the expansion sleeve 16, the expansion tabs 19 are each of like width. To either side of the parting line 17, the expansion sleeve 16 is provided with one tab 20 each. The two tabs 20 stand off beyond the same end of the segment 18 as the expansion tabs 19, are of the same length as the expansion tabs 19, and each form cylindrical surfaces on their interior and exterior having a uniform distance from the centerline of the expansion sleeve 16 and passing over into the corresponding inner and outer surfaces of the segment 18. These non-expansion tabs 20 serve, in manner about to be described in more detail, to retain or fix the expansion sleeve 16 on the element 11, or the portion 12 thereof.

To retain and fix the expansion sleeve 16, the portion 12 has on its outer surface an annular recess or turned neck 21, bounded axially, i.e. at each end, by a shoulder or annular surface 22 and 23 respectively, lying in planes perpendicular to the centerline of the portion 12. In the region of the upper annular face 22 in FIGS. 1 and 2 and in the region of the lower annular face 23 in these figures, the recess 21 is of a depth at least equal to but preferably greater than the thickness of the flat material used to make the expansion sleeve 16. Further, the recess 21 is substantially the shape of a circular cylinder in the region of the annular face 22 as well as in the region of the annular face 23 with a diameter slightly greater than the diameter of the segment 18 of the expansion sleeve 16 in neutral condition. The axial extent of the recess 21, i.e. the distance between the annular faces 22 and 23, is equal to the axial length of the expansion sleeve 16 in the region of the tabs 20, and hence equal to the distance between the lower edge of the segment 18 in FIG. 2 and the free ends of the tabs 20. The expansion sleeve when inserted in the recess 21 thus bears on the annular face 22 by the free ends of its two tabs 20 and on the annular face 23 at the bottom end or edge, away from the tabs 20, and so is held axially undisplaceable in the recess 21, or on the portion 12. The axial extent of the segment 21" matches the axial extent of the segment 18 of the expansion sleeve 16. Between the two segments 21' and 21", the recess 21 has still another segment 21'" in which the outside diameter increases in the manner of a truncated cone with increasing axial distance from the segment 21" in correspondence to the inclination of the expansion tabs 19. The segment 21'" forms a contact and support surface for the expansion tabs 19, which however stand off beyond the end of segment 21'" towards the annular surface 22 by a length, matching the free ends of said expansion tabs 19, about equal to the axial extent of the segment 21', and also project radially beyond the peripheral surface of the portion 12 at their free ends. The maximum diameter of the segment 21'" is in any event smaller by at least twice the thickness of the flat material used to make the expansion sleeve 16 than the outside diameter of the portion 12 outside of the recess 21, so that the element 11 having the form of a plug nipple can be secured in the manner about to be described in more detail by inserting it and catching it in the element 5.

In order to achieve contact at both ends of the expansion sleeve 16 in the region of the tabs 20 with the annular faces 22 and 23 despite the segment 21'" and moreover prevent rotation of the expansion sleeve 16 about the centerline of the portion 12, the recess 21 is provided with a flat 24 at the point where the tabs 20 are placed when the expansion sleeve 16 has been installed, which flat extends throughout the axial extent of the recess, i.e. over the entire region between the annular faces 22 and 23 in all of the segments 21' to 21'".

In the region of the end 12', the part 12 is provided with an annular groove 25 concentrically encircling the centerline of said part and so open both towards the periphery and towards the end 12' that a sealing ring or O-ring 26 placed in said groove 25 will make contact when the coupling part 4 is secured to the hydraulic component 1, not only at its radially external periphery but also frontally, with a sealing surface 27 and 28 respectively, formed in the liquid line 2 of the hydraulic component 1. Since the groove 25 is so executed that the O-ring 26 will be partially contained by the groove 25 at its lower portion in FIG. 1 as well, the O-ring 26 cannot escape from the part 12. By suitable choice of material and appropriately large cross-section, care is taken that the O-ring 26 has an especially large rebound volume.

The sealing surface 27 with which the O-ring 26 cooperates by its radially outer region is formed by the inner surface, in the shape of a circular cylinder, of a segment 2" of the liquid line 2, which segment is of smaller diameter than the segment 2', which is about equal to or slightly greater than the outside diameter of part 12. The surface 27 of the segment 2" thus also serves as support surface for a radial abutment or fixation of the part 12, or element 11. The sealing surface 28 is formed in that the liquid line 2 adjacent to the segment 2" has a segment 2'" of reduced diameter compared to the segment 2", so that in the transitional region between segments 2" and 2'", the annular sealing surface 28 is formed as a shoulder. The diameter of the segment 2'" matches the diameter of part 12 at the end 12'.

The mode of employment of the coupling part 4 described above is that in manufacture of components, afterwards to be connected together, of a hydraulic system, for example in manufacture of hydraulic components 1 and tubing 3 whereby said hydraulic components are to be connected, the hydraulic components 1 are each assembled with the elements 5, and the lines 3 each with the elements 11. This can be done efficiently with no problems in the fabrication of the hydraulic components as well as in the fabrication of the hoses 3. After installation of the hydraulic components 1, for example in a motor vehicle or in a machine, these components 1 may then be connected in an especially simple and assemblywise convenient manner to the hydraulic lines 3 by inserting the particular element 11 in the corresponding element 5. In this plug-in operation, the expansion tabs 19 of the expansion sleeve 16 of the element 11 are in each instance pressed radially inward against their spring action. After passing the shoulder or annular face 10, the expansion tabs 19 spread apart again, and catch behind the annular face 10 by their free ends, so that the particular element 11 is retained securely by catching in the element 5, and so the hose 3 is connected to the corresponding hydraulic component 1. The O-ring 26, which upon insertion of the element 11 in the particular element 5, i.e. until the expansion tabs 19 catch behind the contact surface 10, is further elastically compressed, and after the expansion tabs 19 have caught against the contact surface 10, continues to lie elastically deformed in close contact with the sealing surfaces 27 and 28, seals not only the junction between segment 2'" of the liquid line and the passage 13 from the outside, but also the connection of the coupling part 4 with the hydraulic component 1 as a whole. This also means that owing to the cooperation of the O-ring 26 with the sealing surfaces 27 and 28 on the hydraulic component 1, no additional seal between this hydraulic component 1 and the sleeve-like element 5, and/or between the two elements 5 and 11, is required. Thus the entire seal is achieved by means of a single O-ring 26.

The fixation of the expansion sleeve 16 by means of the tabs 20 and the recess 21 as described above has the advantage that the expansion sleeve 16 is fixed to part 12 with practically no play in axial direction as well, so that the entire restoring capability of the O-ring 26 can be utilized to catch the expansion tabs 19 at the face 10 and elastic contact of the O-ring 26 with the sealing surfaces 27 and 28.

In order to avoid wear of the contact surface 10 by the expansion tabs 19, especially under dynamic or alternating load, the expansion sleeve 19 has slightly rounded edges, at least on the said expansion tabs 19. Also, the expansion tabs may be beveled at their free ends so that they will there make contact with the surface 10 over as much area as possible. To facilitate catching of the expansion tabs 19 behind the contact surface 10 despite such large area of contact, however, it may be expedient to make the expansion tabs 19 with an unbeveled edge at their free ends, and bevel the contact surface 10 slightly instead, i.e. shape it to a conical surface, in order thereby to achieve a large area of contact of the expansion tabs 19 with the surface 10. Further, the element 5, at least in the region of the contact surface 10 consists of a hard, wear-resistant material, i.e. special steel.

The expansion sleeve 16 can be mounted on the part 12 in an especially simple manner by slipping the expansion sleeve 16 on from the end 12'. The diameters here are of course so chosen that the expansion sleeve 16 will not be unduly distended in being pressed on, i.e. will enclose the part 12 in firm contact in the region of the recess 21 after being pressed on.

To insert the element 11 in the particular element 5, owing to the elastic deformation of the expansion tabs 19 here required, some force will be necessary. So that this force may be applied, and in particular at the same time avoiding any action of mechanical forces on the tubing connected to the element 11 when pushing the element 11 into the element 5, and possible damage to the hose by undue bending or kinking, the head 14 is configured as above described in the form of a hand hold or purchase, of comparatively large surface area and/or volume, for an assembly tool.

Figure 4:
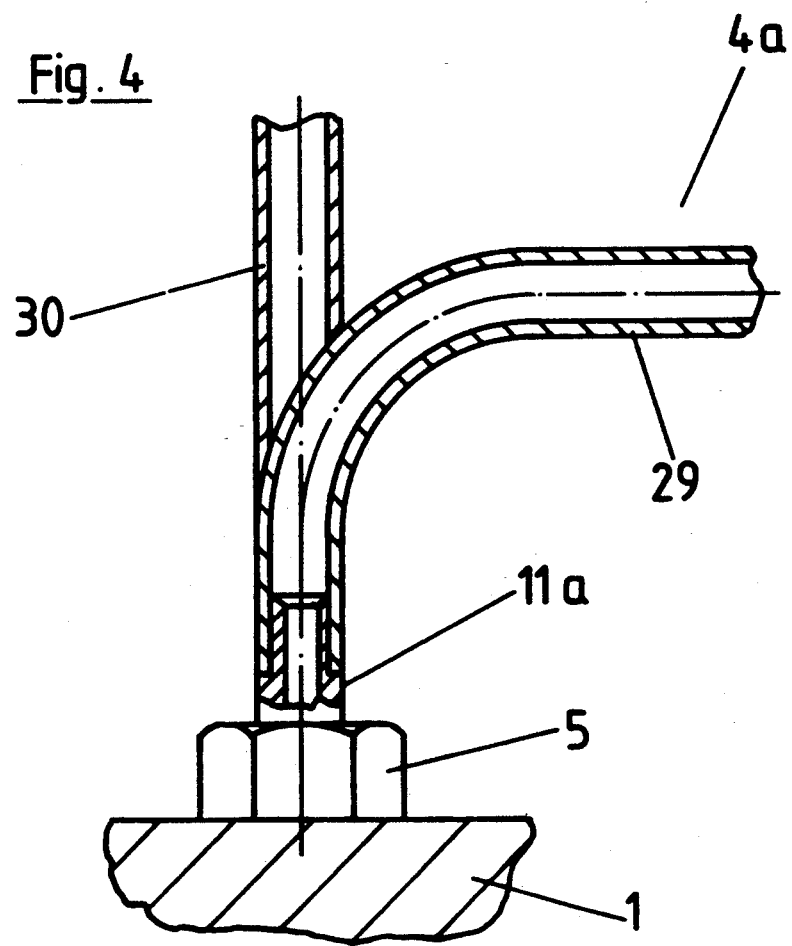
FIG. 4 shows a simplified sectional view of a second possible embodiment of the coupling part according to the invention.

FIG. 4 shows a coupling part 4a differing essentially from the coupling part 4 only in that the element 14a corresponding to the element 11 lacks the head 14 and in that instead of connecting the hose 3 to the element 11a, one end of a curved pipe segment 29 or a straight pipe segment 30 is fixedly connected thereto, for example by hard soldering.

Figure 5:
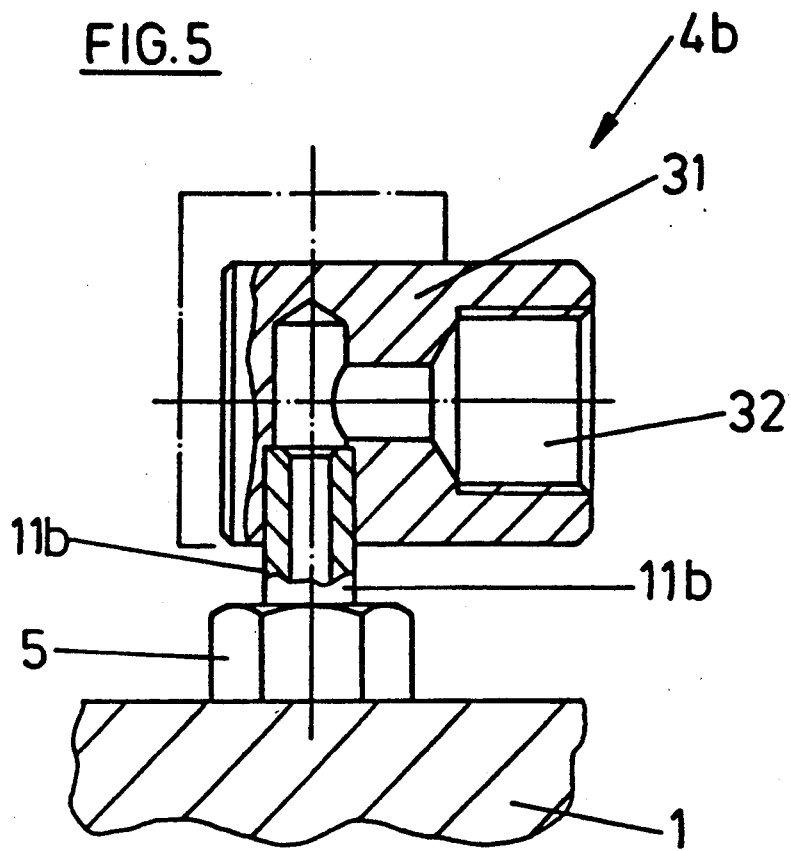
FIGS. 5 and 6, in sectional side view and as seen in the direction of the arrow A, show a third possible embodiment of the coupling part according to the invention.
Figure 6:
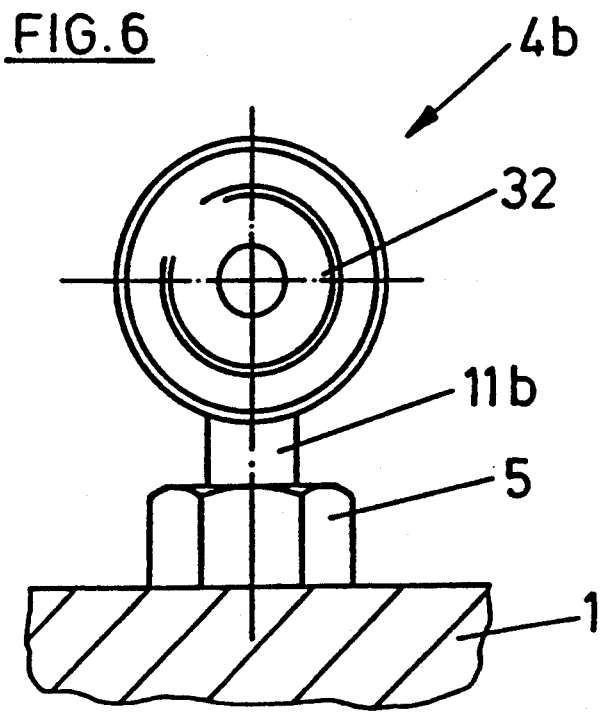

FIGS. 5 and 6 show the coupling part 4b, which again differs from the coupling part 4 only respecting the element 11b corresponding to the element 11, i.e. the element 11b has at its upper end an angle fitting 31 with connection thread 32, to which a hydraulic line of any configuration can be attached by an ordinary screw connection. In the coupling part 4b, the cylindrical angle fitting 31 serves at the same time as a hand hold when plugging the element 11b into the element 5.

Figure 7:
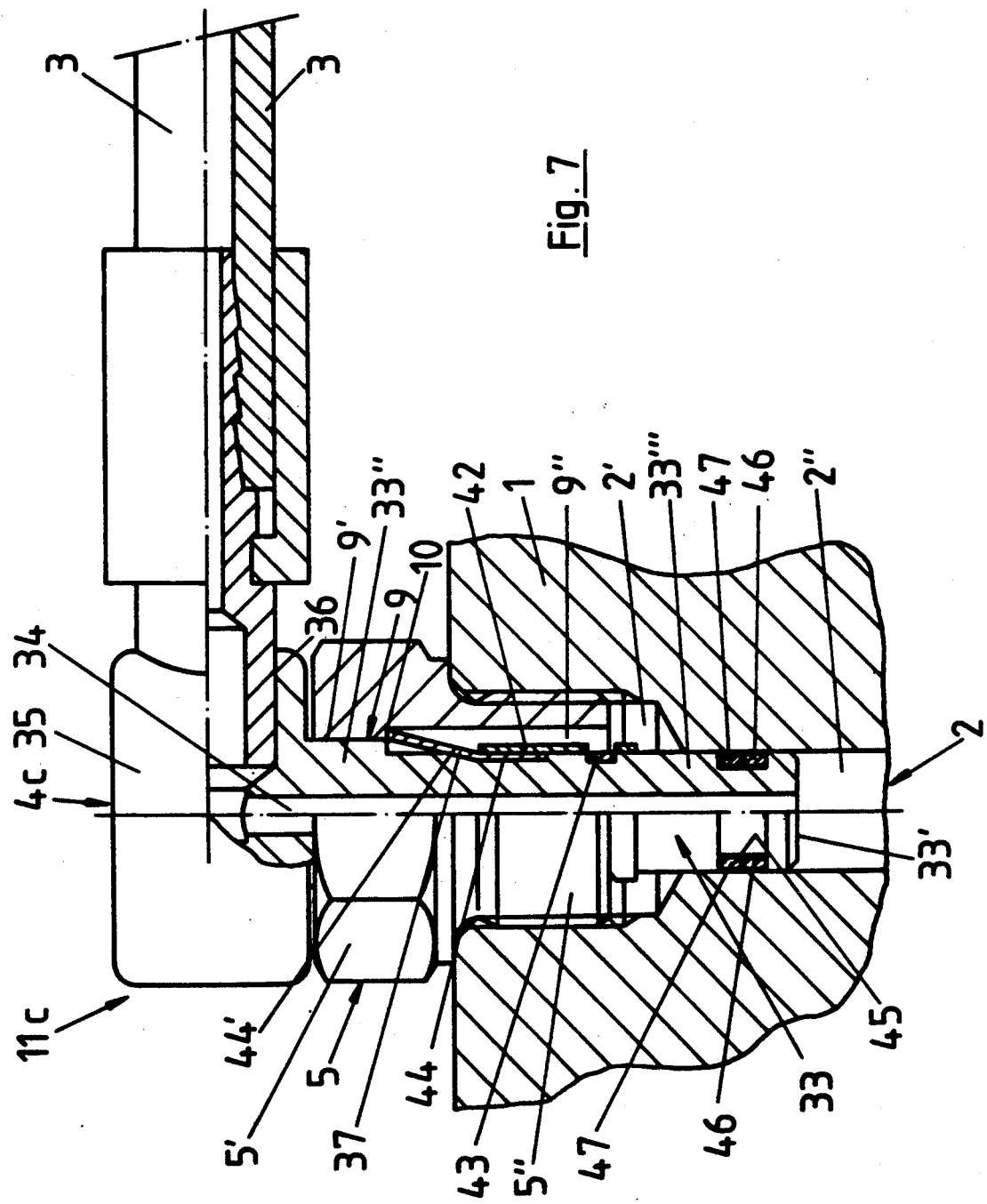
FIG. 7 shows another and improved embodiment of the invention, represented much as in FIG. 1.

FIG. 7 shows, in a representation much like that of FIG. 1, a bipartite coupling part 4c very similar in many respects to the coupling part 4 of FIG. 1, but representing a substantial improvement in some aspects.

In FIG. 7, as before, 1 is the hydraulic component with liquid line 2 formed therein, which however, in departure from FIG. 1, has a substantially constant cross section (segment 2") and is enlarged only in the region of the outside of the hydraulic component 1 on which the coupling part 4c is provided, namely to form the internally threaded segment 2'.

The coupling part 4c again consists of the element 5, of the same configuration as the element 5 of the coupling part 4 and fixed in the segment 2'. Hence in FIG. 7 the element 5 with all its parts is marked with the same reference numerals as were used in FIGS. 1 to 3.

The coupling part 4c consists further of the element 11c, very similar in configuration to the element 11 and consisting essentially of a part 32 in the form of a sleeve or length of pipe having a periphery in the shape of a circular cylinder and provided with a passage 34 coaxial with the centerline of part 33. At the bottom end, the passage 34 is open. At the top end, the passage 34 terminates in a head 35 in the form of an angle fitting, for example made in one piece with the part 33 and having an opening provided with an internal or connecting thread 36 for connecting the hydraulic hose 3. In the case of the coupling part 4c also, the head 35 again serves as a hand hold when thrusting the element 11c into the element 5.

Figure 9:
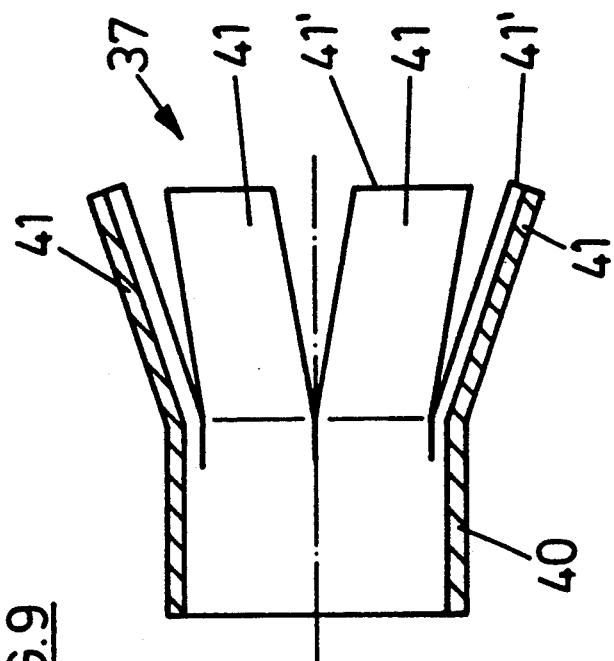
FIGS. 8 and 9 show enlarged details of the expansion sleeve for use with the bipartite coupling part of FIG. 7, in end view and in section at the line III—III in FIG. 8.
Figure 10:
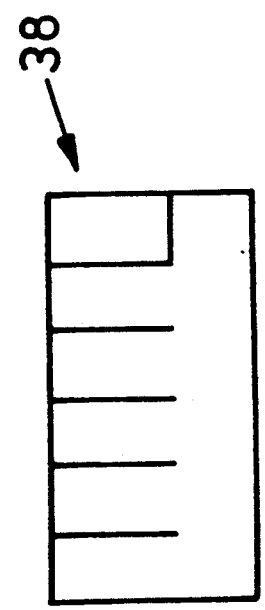
FIG. 10 shows a piece of spring sheet metal cut to produce the expansion sleeve of FIGS. 8 and 9.
Figure 8:
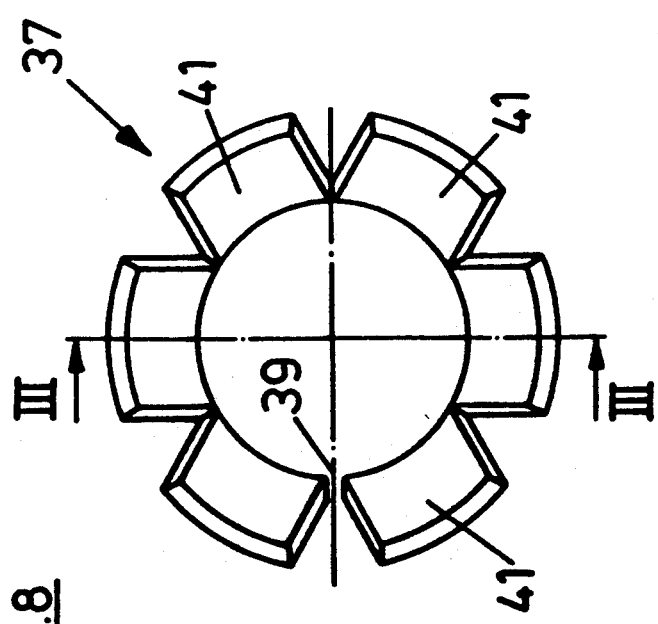

Between the head 35 and the bottom end 33' of part 32, catch elements movable radially inward with spring action are provided on said part, standing off around the circumference, whereby the element 11c, having the configuration of a plug nipple, is retained by catching in the outer element 5. The catch elements are formed out of a single expansion sleeve 37 made out of spring steel sheet 38 cut to shape in one piece by punching and rolling. The expansion sleeve 37 is parted at 39 and has in particular a sleeve-like or hollow cylindrical segment 40. At a common end of the segment 40, i.e. at the top end of said segment in the representation adopted for FIG. 7, six expansion tabs 31 standing off upward from said end are provided, concave on their interior with reference to the centerline of the expansion sleeve 37 and convex on their exterior, each being curved more or less in a circular arc and bent radially outward so that the radial distance of the expansion tabs 41 from the centerline of the expansion sleeve 37 increases with increasing distance from the segment 40 and the expansion tabs 41 make an angle with the centerline of the expansion sleeve. The expansion tabs 41 are of more or less equal width in circumferential direction of the expansion sleeve 37. As shown particularly in FIGS. 8 and 9, the expansion tabs 41 of the expansion sleeve 37 (by contrast with the expansion sleeve 16) are distributed uniformly over the entire circumference. In particular, the expansion sleeve 37 is provided with an expansion tab 41 on either side adjacent to the parting 39 as well. Thus the expansion sleeve 37 has no sector without expansion tabs, as at the tabs 20 of the expansion sleeve 16.

For fixation of the expansion sleeve 37 to the part 33, a sleeve 42 (supporting or attachment sleeve) is used which is likewise made by rolling out of a cut shape of sheet steel or spring steel sheet, concentrically enclosing the centerline of part 33, its upper portion in FIG. 7 enclosing the segment 40 of the expansion sleeve 37 like a cuff and pressing said segment against the periphery of part 33 and/or against the floor of a groove-like depression provided in the periphery of part 33 to accommodate the segment 40. The bottom portion in FIG. 7 of the sleeve 42 projects beyond the segment 40 and rests in contact with the periphery of part 33, being secured to said part by a jog 43 engaging a peripheral groove in part 33 or by other means, for example by welding (spot welding) etc. The sleeve 42 and segment 40 of the expansion sleeve 37 are likewise connected together in suitable manner (for example welding).

The sleeve 42 firstly secures the expansion sleeve 37 to the part 33, especially against axial displacement. Further, the sleeve 43 prevents the segment 40 of the expansion sleeve 37 when the expansion tabs 41 are moved radially inward against spring action. Thus the sleeve 42 contributes quite substantially to improving the dependability and function of the coupling part 4c.

The turned neck or groove-like recess 44 to accommodate the segment 40 again has at its upper edge region in FIG. 7 a segment 44' in the shape of a truncated cone corresponding to the segment 21''' of element 11 and forming an abutment for the expansion tabs 41 to assist them in their action.

As FIG. 7 shows, the tubular part 33 has two segments, namely, beginning with the head 35, a segment 33'' of somewhat larger outside diameter adapted to the diameter of the bore 9, and adjoining this below, the segment 33''', having a somewhat smaller outside diameter and extending to the end 33'. The transition between segments 33'' and 33''' is located more or less in the region of the free ends of the expansion tabs 41. The difference in diameter between segments 33'' and 33''' is at least equal to but preferably somewhat greater than twice the thickness of the material used for the expansion sleeve 37. Further, the outside diameter of the sleeve 42 is like but preferably smaller than the outside diameter of the segment 33''.

In the region of the bottom end 33', the part 33 is provided with an annular groove 45, open towards the periphery only. In this groove, a sealing ring or O-ring 46 and a backing ring 47 are provided, the latter on the side of the sealing ring 46 away from the end 33'.

The mode of operation of the coupling part 4c is the same as described above for the coupling part 4, that is, the hydraulic component, mounted for example in a motor vehicle and preassembled with the elements can be connected to each other in an assemblywise convenient manner by simply inserting the elements 11c preassembled with the lines 3. By this insertion, the expansion tabs 41 are pressed radially inward. After passing the shoulder or annular face, the expansion tabs 41 spread apart again, and catch by their free ends behind the annular face 10 of the particular element 5, so that the elements 5 and 11c are inseparably connected together, thereby also making the hydraulic connection between the tubing and the corresponding hydraulic component. The O-ring 46 is thus in sealing contact with the inner surface of the liquid line, or segment 2'', while the backing ring 47 in known manner prevents extrusion of the sealing ring into the gap to be sealed. Since the sealing ring 46 is in contact only against a cylindrical surface concentrically enclosing the centerline of part 33, and not at the same time with a shoulder made in the liquid line as well, as was true of the sealing ring 26 of coupling part 4, the element 11c may be rotated or swung about the centerline of part 33 by 360° or more even after having been connected to the element 5, and this without damage to the sealing ring 46. In this way, the tubing 33 or the head 35, in the form of an angle fitting, can be oriented after connecting elements 5 and 11c, thus still further simplifying assembly. Since the sealing ring 46 is in contact only with the cylindrical interior surface of the liquid line 2, the placement of the element 11c in the particular element 5 can also be accomplished with less exertion of force (compared to the coupling part 4). No compression of the sealing ring 46 in the direction of insertion is required.

Since the expansion sleeve 37 of the coupling part 4c has its expansion tab 41 on its entire circumference, the anchorage of element 11c in element 5 is substantially improved compared to the coupling part 4, with respect to both static and dynamic loads. In order here also to reduce wear on the contact surface 10 by the expansion tabs 41, especially under dynamic and/or alternating loads, the expansion sleeve 37 again has slightly rounded edges on these tabs. Further, the expansion tabs 41 are preferably beveled at their free ends so as to make contact with the surface 10 over as much area as possible.

FIGS. 11 and 12 show a coupling part 4d differing from the coupling part 4c substantially only in that, instead of the element 5, an element 5a is provided whose bore 9 is of constant cross section. In the case of the coupling part 4d, the contact surface corresponding to the shoulder or face 10 is formed by two prongs 48 of a fork-shaped locking element 49. The prongs 48 of the locking element 49 are introduced from the side into a recess 50 made in the hexagon head or segment 5' and intersecting the bore 9 in such manner that the two prongs 48, whose regions located in the bore 9 form the catch or contact surface for the expansion tab 41, lie in a plane perpendicular to the centerline of the bore, and a bent end 51 of the locking element 49 stands off beyond the periphery of the segment 5', i.e. beyond one hexagon side of said segment. By spring catching in the segment 5' or in other suitable manner, the locking element 49 is secured to said segment 5' against accidentally slipping out of the recess 50. As FIG. 12 shows, the two prongs 48 are of such circular arc shape on their internal sides, including especially in the region of the end 1, that they are effective as contact surface for the expansion tab 41 over as wide an angular interval as possible with respect to the centerline of the element 5a.

In the case of the locking element 49 provided on the element 5a, the connection of the elements 5a and 11c takes place in the same manner as previously described for the coupling part 4c. With the aid of a suitable tool, for example with the aid of a screw driver, the locking element 49 can be removed from the element 5a to sunder the connection, whereupon after release of the expansion tab 41 the element 11c can be pulled out of the element 5a. Advantages of this construction are not only the relatively simple disassembly of the two elements of the coupling part 1b, but also that the element 5a with locking element 49 may be provided practically anywhere on an exterior surface of the hydraulic component 1, since owing to the accommodation of the locking element 49 in the segment 5' of the element 5a, the releasable connection using the locking element 49 can be provided practically anywhere on a surface of the hydraulic component.

The segments 21''' and 44' of truncated conical shape in coupling parts 4 to 4d act not only as support for the expansion tabs 19 and 41 of the expansion sleeves 16 and 37 respectively but serve also to enhance dependability in operation in that after assembly of the particular expansion sleeve 16 or 37, they always positively ensure that the expansion fingers 19 or 41 will have the requisite spread, i.e. will stand off in the required manner beyond the periphery of the particular element 11, 11a, 11b or 11c as the case may be. Owing to the truncated cone segment 21'' and 44, it is possible moreover to make the expansion sleeve 16 or 37 in question by simple punching and rolling, for example from a cut-out 38, without requiring any further operation to spread the expansion tabs 19 or 41. This is then accomplished of itself by the supporting surfaces when the expansion sleeve 19 or 37 in question is installed. This results in a substantial simplification of production.

Figure 13:
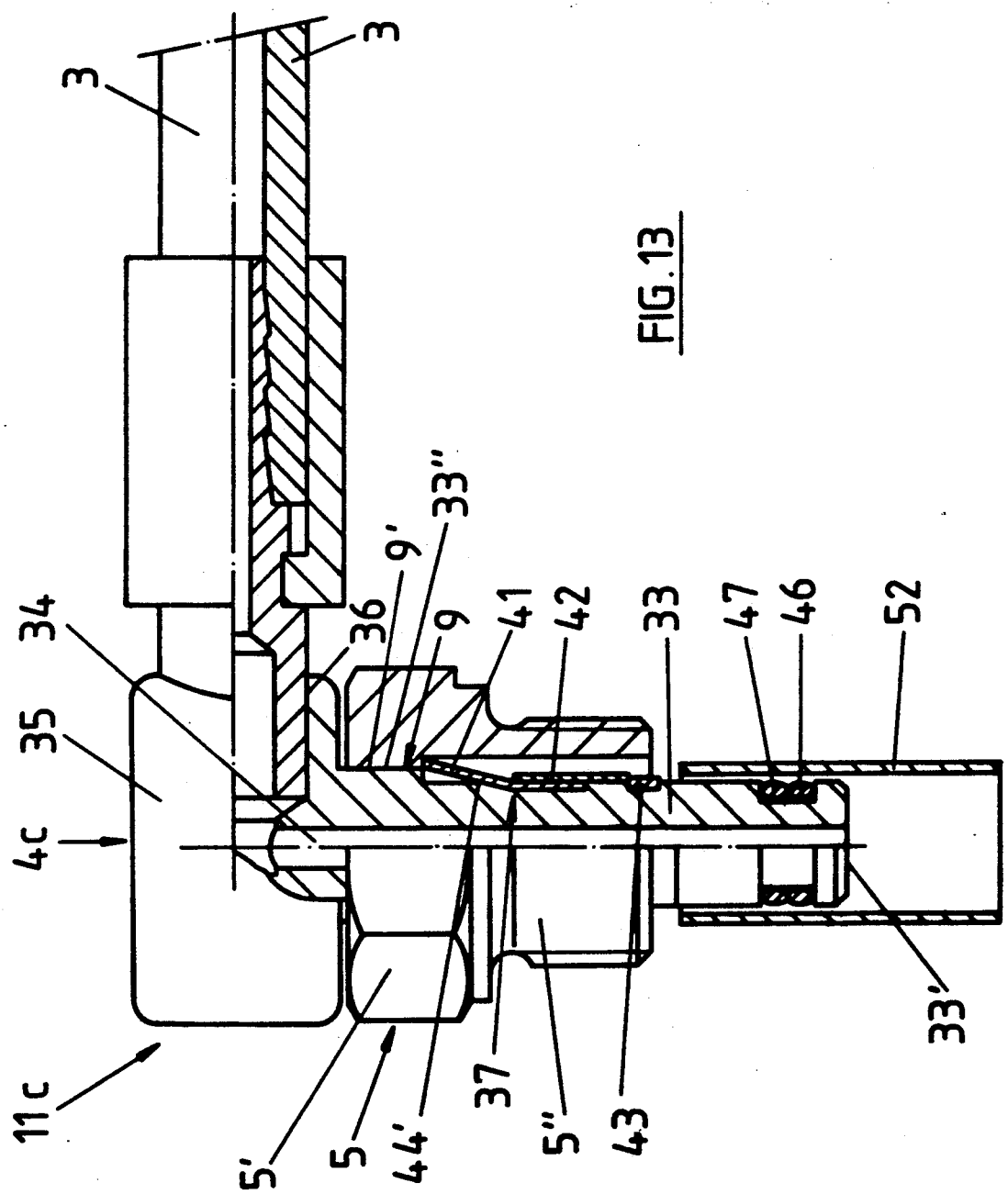
FIG. 13 shows an unlocking sleeve together with a partial representation of the bipartite coupling part of FIG. 7.

FIG. 13 shows an unlocking sleeve 52, i.e. a tool specially intended for use with the coupling part 4c and serving to separate the two elements 5 and 11c of this coupling part in case of repair, i.e. when the element 5 has been screwed out of the hydraulic component 1. The metal unlocking sleeve 52, formed for example from a length of tubing or produced from cut sheet metal by rolling, has an inside diameter equaling the outside diameter of the sleeve 42 and an outside diameter somewhat smaller than the diameter of the bore 9 of element 5.

So that the unlocking sleeve 52 can be used, the element 11c is of such configuration that the outside diameter of the sleeve 42 is smaller by at least twice the wall thickness of the unlocking sleeve 52 than the diameter of the bore 9. To free the element 11c from the element 5 when screwed out of the hydraulic component 1, the unlocking sleeve 52 is slipped onto part 33 from the end 33', and into the open end of element 5 into the region of the expansion tabs 41. These are then pressed radially inward by the unlocking sleeve 52, releasing them from the contact surface 10 and allowing the element 11c to be pulled off from the element 5. Since the expansion tabs 41 provided are uniformly distributed over the circumference of part 33, i.e. the expansion sleeve 37 has no sector without expansion tab 41, an exact centering of the expansion sleeve in relation to the centerline of part 33 is ensured when the unlocking sleeve 52 is threaded onto the expansion arms 41, and accordingly the unlocking sleeve 52 is able to press all expansion tabs 41 inward uniformly. This unlocking by means of the sleeve 52, i.e. the uniform pressing inward of the expansion tabs 41, is further assisted by the segment 44' forming the surface of contact or support for the expansion fingers 41.

Figure 14:
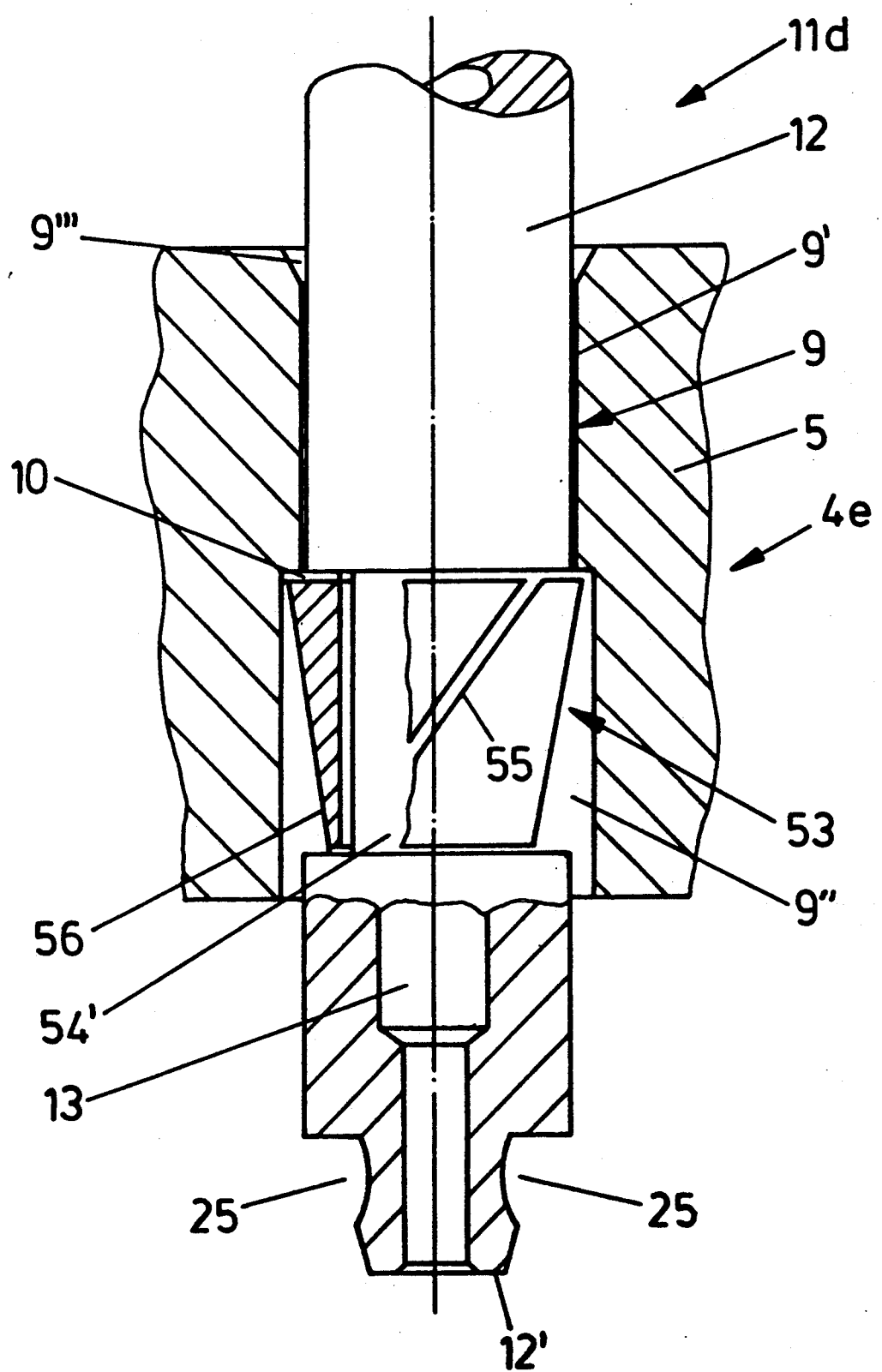
FIG. 14 shows still another possible embodiment of the invention, represented much as in FIG. 1.

FIG. 14 shows a coupling part 4e substantially like the coupling part 4 but in which, instead of the expansion sleeve 16, a ring 53 is provided, arranged in a recess 54, like the recess 21, in the element 11d. In the region of the recess 54, the element 11d has a constant outside diameter, i.e. it there lacks in particular the truncated cone segment 21'''. The ring 53 is slit, i.e. provided with a through slit 55 extending obliquely, i.e. the slit 55 lies in an imaginary plane intersected by the centerline of the element 11d at an angle of less than 90°, the ring 53, having its centerline coaxial with or parallel to the centerline of the element 11d, can bear against an annular surface bounding the recess 54 by its upper and lower end faces. On its periphery, the ring 53 has the configuration of a truncated cone so that the outside diameter of the ring diminishes from the top end face, in the representation adopted for FIG. 14, towards the bottom end face of the ring 53, i.e. the ring 53 has its end face of smaller outside diameter closer to the end 12' of the element 11d than its end face having the greater outside diameter. At least at the end having the greater diameter, the outside diameter of the ring 53 is greater than the diameter of the segment 9' of the bore 9, so that the element 11d is anchored to the element 5 by the ring 53. Owing to the slit 55, the ring 53, made of a springy or elastic material, preferably spring steel, can act as a spring or expansion ring, i.e. when the element 11d is pushed into the element 5, viz. into the bore 9 therein, the ring is first elastically deformed in the direction of a reduction of its outside diameter by way of its outer truncated conical surface 56, which bears against the surface of the bore 9, and then snaps behind the contact surface 10, locking the element 11d. It will be understood that in locked condition, the inside diameter of the ring 53 is greater than the outside diameter of the element 11d in the region of the recess 54. Owing to the obliquity of the slit 55, despite a relatively great slit width, a reliable anchorage of the element 11d in the element 5 is achieved even at the high surface pressures in hydraulic applications, for example about 250 bars, namely in that the ends of the slit in the top and bottom ends of the ring 53 are not directly opposed. Owing to the truncated conical outer surface 56, in this embodiment also an unlocking by means of the unlocking sleeve 52 is possible if required.

The invention has been described above in terms of embodiments by way of example. It will be understood that many changes and modifications are possible without departing from the idea and spirit of the invention. Independently of the specific conformation, all embodiments described combine the advantage that in installation of the hydraulic components, for example in a vehicle or in a machine, the connection between the several components can be made in simple manner by plug-in assembly alone, with the advantage of a screw connection, whereby it is possible to sunder the connection in question in event of repairs. For coupling parts 4, 4a, 4b, 4c, this is possible only with a suitable tool. The coupling parts are of course of such dimensions that they can be used with conventional hydraulic components. In a preferred application to microhydraulic components, the length of the elements 5 or 5a (distance between end faces 6 and 7) is for example only 14 mm. The other dimensions will then be correspondingly small.

I claim:

1. Coupling part to make a hydraulic connection between a first and a second hydraulic component, the coupling part being attachable to said first component (3, 29, 30) and releasably securable in a receptacle provided on said second component (1), the coupling part comprising:

an outer element (5, 5a) and an inner element (11, 11a, 11b, 11c), the outer element (5, 5a) being sleeve-like with a through opening (9), the outer element having an outer surface, the outer surface being externally threaded at one end for connecting to the second hydraulic component (1) and the outer surface having a tool hold surface (5'), the inner element (11, 11a, 11b, 11c) at least in a portion (12, 33) constituting one end (12', 33') of said inner element being likewise of sleeve-like configuration, the inner element having a passage (13, 14) open at said one end (12', 33') and open also at the other end of the inner element (11, 11a, 11b, 11c), the first hydraulic component (3, 29, 30) being attachable to the other end of the inner element, the inner element (11, 11a, 11b, 11c) being introducible by its sleeve-like portion (12, 33) into the opening (9) of the outer element (5, 5a) from the other end (6) of the outer element, and spring fingers (19, 41) for resiliently snapping behind a catch surface (10) of the outer element (5) thereby locking the inner element to outer element, the spring fingers being formed on a catch sleeve (16, 37) which is fixed to the inner element (11, 11a, 11b, 11c), the spring fingers standing off from the catch sleeve in a direction inclined from the centerline of the catch sleeve, the spring fingers (19, 41) being forced radially outward by their own natural resilience, the inner element (11, 11a, 11b, 11c) having a contact surface, the contact surface being formed in the shape of a conical taper (21''', 44') for the support of the spring fingers (19, 41), the spring fingers (19, 41) extending beyond said conical taper (21''', 44').

2. Coupling part according to claim 1, characterized in that the spring fingers (19, 41) stand off from a sleeve-like or hollow cylindrical segment (18, 40) of the catch sleeve (16, 37), in that the catch sleeve (16, 37) is held to the inner element (11, 11a, 11b, 11c) substantially by said sleeve-like or hollow cylindrical segment (18, 40), and in that the contact surface (21''', 41') serves to support the spring fingers (19, 41) in the region of a lengthwise portion adjoining the sleeve-like segment (18, 40).

3. Coupling part to make a hydraulic connection between a first and a second hydraulic component, the coupling part being attachable to said first component (3, 29, 30) and releasably securable in a receptacle provided on said second component (1), the coupling part comprising:

an outer element (5) and an inner element (11d), the outer element (5) being sleeve-like with a through opening (9''), the outer element having an outer surface, the outer surface being externally threaded at one end for connecting to the second hydraulic component (1) and the outer surface having a tool hold surface (5'), the inner element (11d) at least in a portion (12) constituting one end (12') of said inner element being likewise of sleeve-like configuration, the inner element having a passage (13) open at said one end (12') and open also at another end of the inner element (11d), the first hydraulic component being attachable to the other end of the inner element, and the inner element (11d) being introducible by its sleeve-like portion (12) into the opening (9'') of the outer element (5) from the other end (6) of the outer element, and a slit ring (53) fixed to the one end (12') of the inner element (11d), the slit ring (53) being forced radially outward by its own natural resilience so as to snap behind a catch surface (10) of the outer element (5) thereby locking the inner element to the outer element when the one end (12') of the inner element (11d) is introduced into the opening (9'') of the outer element (5).

4. Coupling part according to claim 1 characterized in that the inner element (11, 11a, 11b, 11c) after being connected to the outer element (5, 5a) protrudes from the outer element (5, 5a) by its one end (12', 33') inside the receptacle (2) of the second fluid-handling component (1).

5. Coupling part according to claim 4, characterized in that, using at least one seal (26, 46), a junction sealed off from the outside is formed between the one end (12', 33') of the inner element (11, 11a, 11b, 11c), or the open passage (13, 34) there in the inner element (11, 11a, 11b, 11c), and a liquid line (2) formed in the second fluid-handling component (2).

6. Coupling part according to claim 5, characterized in that the seal is a sealing ring or O-ring (26) of elastic material having an especially large rebound volume, provided at the one end (12') of the inner element (11, 11a, 11b), and in that when the elements (5; 11, 11a, 11b) are connected together, the sealing ring (26) rests in contact with at least one sealing surface (27, 28) formed inside the receptacle (2', 2'').

7. Coupling part according to claim 2, characterized in that the catch sleeve (16, 37), at its two ends displaced from each other in the direction of the centerline of the catch sleeve, forms at least one contact surface each which, for axially securing the catch sleeve (16) on the inner element (11, 11a, 11b), rests against one each of at least two backing surfaces (22, 23) formed on said element (11, 11a, 11b), preferably at a peripheral recess (21) thereof, and in that the distance of the two backing surfaces (22, 23) is equal to the distance of the two contact surfaces, while preferably the catch sleeve (16), in addition to the spring fingers (19) inclined to the centerline of the catch sleeve (16), has at least one other tab (20) preferably standing off together with the spring fingers (19) beyond a common end of the sleeve-like segment (18) but substantially parallel to the centerline of the catch sleeve (16) and forming one of the least two contact surfaces of the catch sleeve (16) at the free end thereof.

8. Coupling part according to claim 7, characterized in that at least two additional tabs (20) are provided on either side of the catch sleeve 16.

9. Coupling part according to claim 1 characterized in that the inner element (11, 11b, 11c), on a lengthwise portion projecting beyond one end (6) of the outer element (5, 5a) after introduction of the inner element (11, 11b, 11c), is configured with a head piece (14, 31, 35) broadened in cross section, said head piece being preferably provided in the region of the other end of the inner element (11, 11b, 11c).

10. Coupling part according to claim 5 characterized in that the seal is a sealing ring or O-ring (46) provided at one end (33') of the inner element (11c) and concentrically enclosing a centerline of the inner element (11c), and in that, when the elements (5, 5a; 11c) have been connected together, the sealing ring (46) lies in contact with a cylindrical sealing surface formed in the receptacle (2', 2'') and concentrically enclosing the centerline of the inner element (11c).

11. Coupling part according to claim 1, characterized in that the sleeve-like segment (40) of the catch sleeve (37) is enclosed by a sleeve (42) and in that the sleeve (42) is fixed or secured to the inner element (11c).

12. Coupling part according to claim 1, characterized in that the spring fingers (41) are uniformly distributed around the entire circumference of the inner element (11c).

13. Coupling part according to claim 1 characterized in that the catch surface (48) is formed by at least one locking element (49) releasably provided on that element of the coupling part which comprises said catch surface, preferably the outer element (5a) of the coupling part.

14. Coupling part according to claim 13, characterized in that at least one locking element (49) is insertably provided on the element (5a) comprising the catch surface (48), to wit displaceably in an axial direction extending transverse or perpendicular to that axial direction in which the inner element (11c) is introducible into the outer element (5a).

15. Coupling part according to claim 13, characterized in that the at least one locking element (49) is provided on a segment of that element (5a) of the coupling part (4d) which comprises the catch surface (48), which (portion) projects beyond the second hydraulic component (1).

16. Coupling part according to claim 13, characterized in that the locking element (49) is of fork-shaped configuration with two prongs (48) forming the catch surface.

17. Coupling part according to claim 3 characterized in that the ring (53) as a slit (55) extending oblique to the centerline of the ring and/or in that the ring (53) is of truncated conical configuration at its outer surface (56).

18. Puller tool for use with a coupling part according to claim 1, characterized by configuration thereof as an unlocking sleeve (52).

* * * * *

UNITED STATES PATENT AND TRADEMARK OFFICE
CERTIFICATE OF CORRECTION

PATENT NO. : 5,197,770
DATED     : March 30, 1993
INVENTOR(S) : Jurgen Knapp

Figure 2:
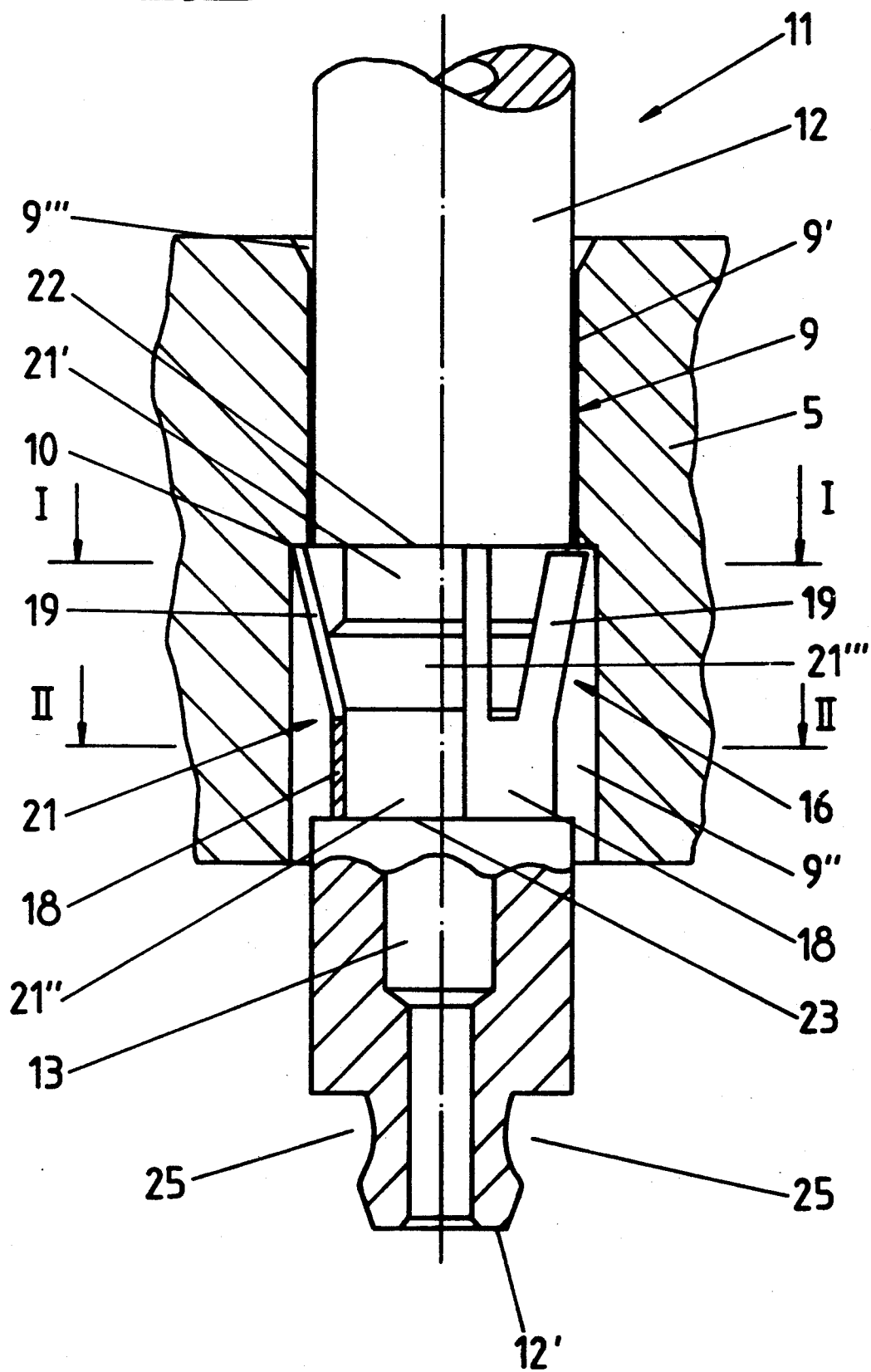
FIG. 2 shows an enlarged partial view, in partial section, of the outer and the inner element and the expansion sleeve, holding the inner element in the outer element, of the bipartite coupling part according to FIG. 1.
Figure 3:
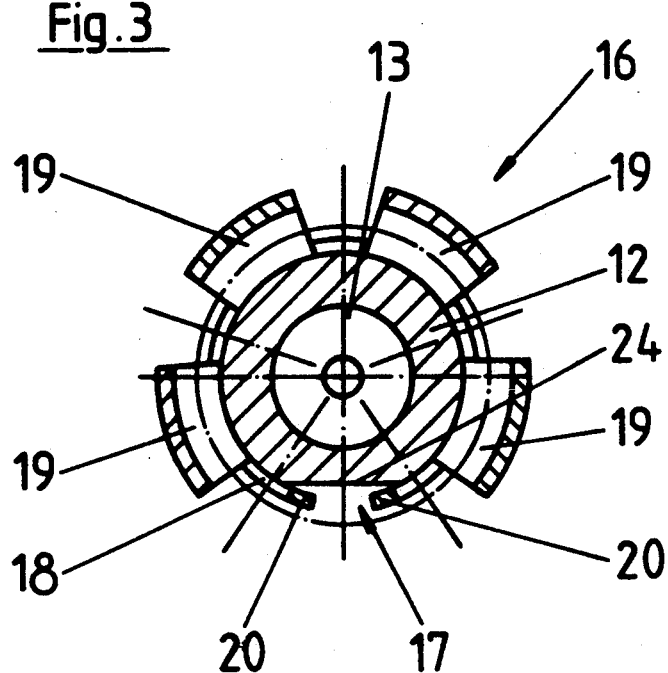
FIG. 3 shows a section at the line I—I in FIG. 2.

It is certified that error appears in the above-identified patent and that said Letters Patent is hereby corrected as shown below:

Column 3, line 30, change "Fig. 1" to --Fig. 2--.

Column 14, line 62 (claim 17), change "as" to --has--.

Signed and Sealed this

Seventh Day of December, 1993

Attest:

BRUCE LEHMAN

Attesting Officer       Commissioner of Patents and Trademarks